July 28, 1936.    W. O. TAIT, JR    2,048,978
STEERING MECHANISM FOR VEHICLES, ETC
Filed Nov. 11, 1930
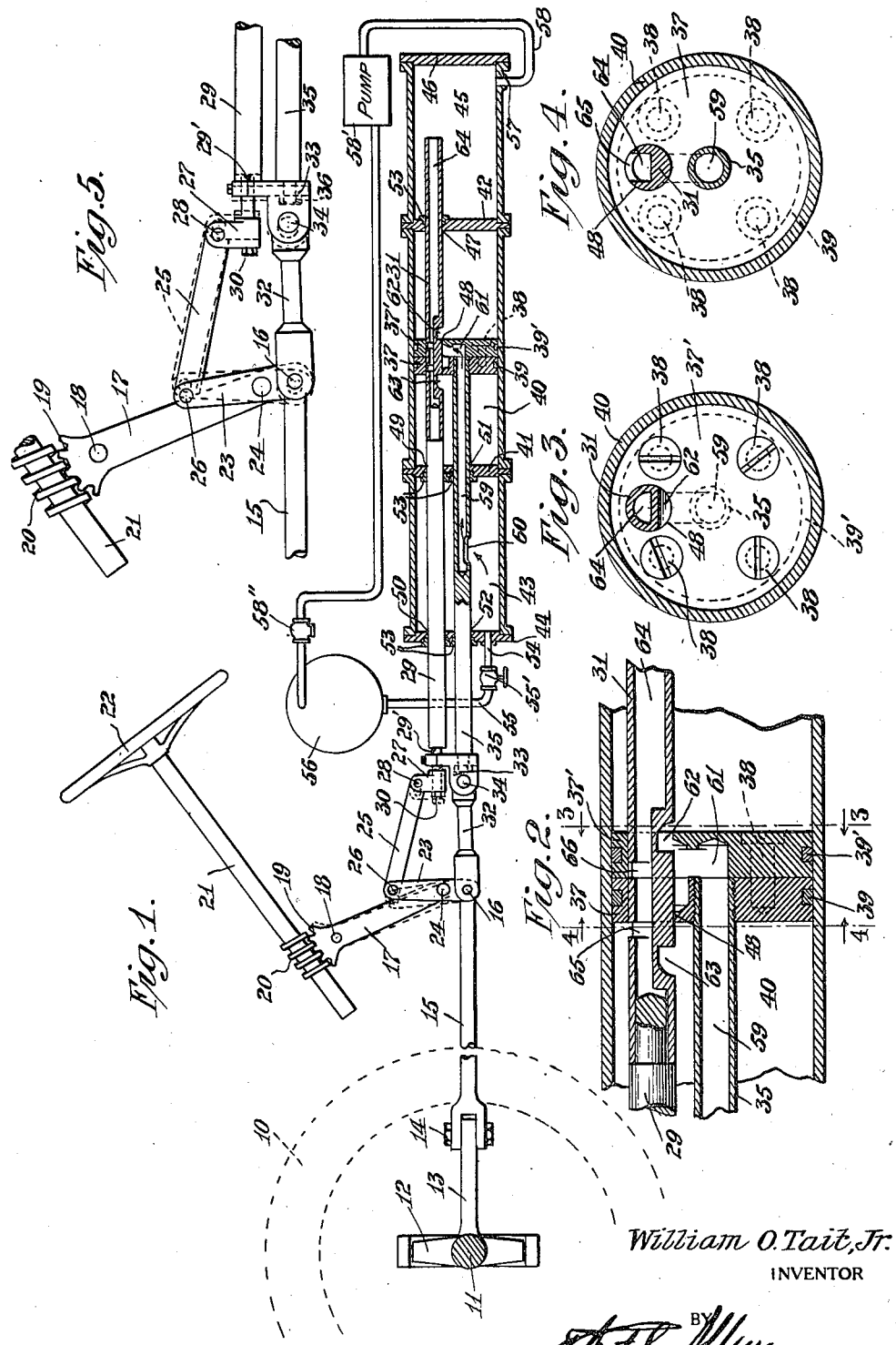
William O. Tait, Jr.
INVENTOR Patented July 28, 1936

2,048,978

UNITED STATES PATENT OFFICE 2,048,978

STEERING MECHANISM FOR VEHICLES, ETC.

William O. Tait, Jr., Crestwood, N. Y., assignor to Sheldon Hydraulic Corporation, New York, N. Y., a corporation of New York Application November 11, 1930, Serial No. 494,916

2 Claims. (Cl. 121—41)

My invention relates to power control of mechanical operations where the amplitude, speed and direction of motion are variable and where power control would be advantageous to augment controlling impulses of electrical, mechanical or manual origin.

One object of the device is to permit the application of power to accomplish useful work in such a manner that the amount of motion, speed of motion and direction of the coacting mechanism will be at all times subject to a controlling force.

Another object is to provide means whereby the controlling force may supplement the source of power.

A further object is to provide means whereby the controlling force may accomplish the work of itself in event of the failure of the source of power.

A still further object is to provide means whereby the shift from power operation to operation by means of the controlling force, as might be desirable in the event of failure of the source of power as above mentioned, shall be instantaneous, automatic and involve no mechanical, electrical or manual operations whatsoever, nor thought or volition on the part of the operator if the controlling force be of human agency.

The device has an extremely wide field of application including the steering of motor vehicles and marine craft, opening and closing doors, training guns, operating the controls of aeronautical craft and such operations where manual control may be inadequate or slow.

The power for this device is derived from a source of pressure which may be gaseous or liquid. Under gaseous pressure operation, the exhaust is normally to the atmosphere. Under liquid pressure operation the exhaust is normally to some suitable receptacle for the preservation and reclamation and re-use of the liquid.

For illustrative purposes my device is shown in the accompanying drawing as applied to the steering mechanism of an automobile utilizing liquid under pressure as the power source.

Fig. 1 shows a side elevation and partial section of my device as applied to the steering mechanism of an automobile with the power control valve in the closed position and in dotted lines, the initial valve opening when the steering wheel is moved to make a left turn.

Fig. 2 is an enlarged section showing the relative positions of the piston and valve in the open position of Fig. 1.

Fig. 3 is a cross section on the plane of the line 3—3 of F'g. 2.

Fig. 4 is a cross section on the plane of the line 4—4 of Fig. 2.

Fig. 5 is a side elevation showing the relative positions of the piston and valve rod ends with the connected links in the second position of Fig. 1 and in dotted lines in the succeeding position during a left turn movement.

Under the usual conditions of manual operation, without my invention the wheel 10 mounted on the axle 11 is held in alined position or turned as desired by the steering knuckle 12, steering arm 13 and steering rod pin 14 through the movement of the reach rod 15, ball joint pin 16, lever 17 about the fulcrum pin 18, gear 19 and worm 20 carried on the steering post 21 in accordance with the direction of movement of the steering wheel 22 in the hands of the driver. In the heavier types of cars having wide tread tires it has been found that this operation requires the expenditure of a large amount of muscular force, particularly when the car is not in motion, on account of the frictional resistance between the tire treads and road surface at their points of contact. In fact the power required is sometimes greater than the driver can supply so that it is impossible to turn the wheels at all.

In the particular form shown herein as one type of my invention, the device is connected in this steering system by disconnecting the reach rod 15 and the lever 17 at the ball joint 16 and interposing the control lever 23 which is secured at an intermediate point in its length to the lower end of the lever 17 by the fulcrum pin 24 through the hole formerly occupied by the ball joint pin 16. If this hole is tapered, a suitably tapered bushing may be used to adapt it to receive the cylindrical bearing on the pin 24.

At the upper end of the control lever is attached the front end of the control link 25 by means of the pin 26 and the rear end of the link is hinged to the control rod head 27 by the pin 28. The control rod head is bored to receive the front end of the control rod 29 held in place by the nut 30. The control rod extends horizontally to the rear and is adapted to receive a hollow extension 31 having the same outside diameter as the control rod and is open at the rear end but closed at the front end by the inserted end of the control rod.

The lower end of the lever 23 is hinged to the front end of the power link 32 by the pin 16 to one end of which the rear end of the reach rod 15 is fastened by the usual ball joint. To the rear end of the power link is hinged the power rod head 33 by means of the pin 34. The rear portion of the power rod head forms a vertical transverse plate having two vertically aligned horizontal cylindrical apertures, the lower one adapted to receive the forward end of the power rod 35 to which it is secured by the nut 36 and the upper one having a sliding fit about a reduced portion of the forward end of the control rod 29 between the control rod head 27 and a shoulder formed by the full diameter portion of the control rod at 29'.

On the rear end of the power rod 35 is screwed the forward half of the piston 37 to which is fastened the rear half of the piston 37' by bolts 38. The piston sections 37 and 37' carry packing rings 39 and 39' respectively recessed in annular openings in their outer cylindrical surfaces.

The piston 37, 37' fits the bore of the power cylinder 40 which is closed at the forward end by the plate 41 and at the rear by the plate 42. In front of the plate 41 is bolted the pressure cylinder 43 of which this plate forms the rear end and the front end of cylinder 43 is closed by the plate 44. To the rear of plate 42 is bolted the drainage cylinder 45 of which that plate forms the front end and the rear end of cylinder 45 is closed by the plate 46.

Aligned openings 47 in plate 42, 48 in the piston, 49 in plate 41 and 50 in plate 44, are provided to permit the passage of the control rod 29 through plates 44 and 41 and of the control rod extension 31 through the piston and the plate 42.

Aligned openings 51 in plate 41 and 52 in plate 44 are also provided to permit the power rod 35 to slide through them.

The openings 47, 49, 50, 51 and 52 are provided with packing glands 53.

An opening into the lower portion of the pressure cylinder such as 54 is threaded to receive the end of the pressure supply pipe 55 from the pressure reservoir 56. Flow through this pipe may be controlled by a valve 55' if desired.

The drainage cylinder has an opening at the bottom such as 57 adapted to receive a drain pipe 58 through which it may be emptied. If desired, this pipe may be connected to the inlet of a pressure pump 58' so that the contents may be discharged into the pressure reservoir 56 through a suitable check valve 58".

The power rod is centrally bored from its rear end forward to a point which will always lie within the pressure cylinder 43 to form the passage 59 which has an opening 60 at the bottom near the front end having an area at least equal to that of the cross section of the hole 59, and is so positioned that it will always lie within the pressure cylinder 43. The rear end of the passage 59 opens into a passage 61 formed in the piston which has an upper opening into the passage 48 in the lower side thereof. When the power system is in equilibrium this opening or pressure front is closed by the outer surface of the control rod extension 31.

The outer wall of the control rod extension has two horizontal grooves 62 and 63 formed in its lower side separated by a distance equal to the thickness of the piston and so positioned that when the system is in equilibrium the groove or port 62 is entirely behind the rear face of the piston and the groove or port 63 is entirely in front of the front face of the piston.

The control rod extension 31 has a longitudinal drainage bore 64 which is partially reduced opposite the ports 62 and 63 so that there is no opening between the bore and these ports (see Figs. 2 and 3). Above this restricted portion and between the ports 62 and 63 there are two ports 65 and 66 through the upper wall of the control rod extension which are closed by the upper wall of the opening 48 in the piston when the power system is in equilibrium. (See Figs. 2 and 4.) The bore 64 is closed at the front end and open into the drainage cylinder 45.

In operation, using a liquid such as oil for the pressure transmitting medium, the pressure reservoir 56, pipe 55 and pressure cylinder 43 are filled with oil under pressure from a suitable source, the power cylinder 40 is filled with oil on both sides of the piston and the drainage cylinder 45 is empty, and the parts of the device in the position shown in full lines in Fig. 1.

Assuming that it is desired to turn the wheel 10 to make a left turn, the steering wheel 22 is turned in a counter-clockwise direction as usual, rotating the steering post 21 and the worm 20 in the same direction. This causes the gear 19 and the arm 17 to rotate in a clockwise direction about the fulcrum pin 18, and since the wheel 10 offers frictional resistance to the forward motion of the ball joint pin 16, the forward movement of the pin 24 in the lower end of the arm 17 causes the lever 23 to move about the pin 16 as a fulcrum in a counter clockwise direction.

This forward movement brings the several port openings in the control valve extension and the piston into the relative positions shown in Fig. 2 so that oil under pressure can pass from the cylinder 43 through the opening 60 and the bore 59 in the power rod 35 and thence through the port 61 of the piston and the port 62 of the control rod extension into the rear chamber of the power cylinder 40. At the same time the port 65 is opened between the front chamber of the power cylinder 40 and the drainage bore 64, allowing oil to escape from the front of the power cylinder into the drainage cylinder. Under the influence of the unbalanced pressure in the rear chamber, the piston moves forward pushing the power rod 35 power link 32 and ball joint pin 16 ahead so that the reach rod 15, pin 14, arm 13, knuckle 12 and axle 11 coact in the usual manner to turn the wheel 10 to the left.

If it is desired to effect this turning movement more rapidly than it would normally occur under the impulse of the power piston alone, additional turning motion may be made with the steering wheel which will cause a further forward movement of the pin 24, pin 26, link 25, control rod head 27 and control rod 29 so that the shoulder 29' will contact with the upper portion of the power rod head 33 and help to move it forward, thus supplementing the motion imparted by the moving power piston.

While the counter clockwise rotation of the steering wheel is continued the pin 24 advances and holds the control rod and piston in the relative positions shown in Fig. 2 as they move forward together through the power cylinder. When the steering wheel movement is stopped by the driver the lever 23 and links 25 and 32 are in the relative positions shown in full lines in Fig. 5. The pin 24 stops and becomes the fulcrum point for a clockwise rotation of the lever 23 moved forward at the bottom by the pressure in the rear of the piston until the ports 62 and 65 are closed by the combined forward motion of the piston and rearward motion of the control rod extension as it moves to the rear under pressure received through the pin 26, control link 25 and pin 28 so that the links and lever 23 take the relative positions shown in dotted lines in Fig. 5 as the pressure on both sides of the piston becomes equalized.

A further turn to the left may be made by a further counter clockwise motion of the steering wheel within the mechanical limits of the front wheel motion, repeating the same cycle of operations.

The front wheels may be turned to the right by turning the steering wheel in a clockwise direction, thereby reversing the movements of the links and connected parts which then will coact to admit pressure to the forward end of the power cylinder through the ports 61 and 63 and drain the oil from the rear end of the power cylinder through the port 66 and the drainage bore 64, causing a backward movement of the piston and the connections to the wheel.

Due to the pressure exerted by the power cylinder I have found that the force required to turn the steering wheel is greatly reduced, giving easier control and causing less fatigue to the driver.

Since the motion of the wheels is limited by the movement of the power piston in a cylinder filled with oil, any shocks due to rough road surfaces, front tire "blow outs" etc., will be cushioned by the oil, the power cylinder serving as a dash-pot and preventing sudden strains on the steering wheel which might cause the driver to lose control of the direction of the car.

In case the pressure should fail for any reason the car could still be steered in the usual manner of a hand controlled steering car without any change in the apparatus. To make a left turn, for instance, the same sequence of operations will obtain involving the forward movement of the control rod 29 which then moves ahead until the shoulder 29' contacts with the upper portion of the power rod yoke 33 and both rods then move forward together to move the reach rod 15 and the connected steering rods to turn the front wheels to the left. In making a right turn the desired effect is obtained when the upper part of the power rod head contacts with the rear face of the control rod head 27 to move the power rod and connected parts rearwardly. While the operations allow a little more lost motion in the steering mechanism than when the pressure is effective I have found that the total lost motion is no greater than that usually considered desirable in manually steered cars.

It will thus be seen that my device permits the application of power control to mechanisms making them fully responsive to comparatively lesser impulses from the normal controlling agency, with or without supplementary action of the controlling agency and so arranged that in case of the failure of the power source the amplitude, speed and direction of the motion will be effected in a normal manner by the controlling agency without interruption, mechanical or electrical adjustments or volition of the operator.

I claim:

1. A power control device comprising a chamber containing a fluid power medium under pressure, a closed power cylinder, a piston slidably mounted in said cylinder, a control rod mounted to reciprocate within said chamber, piston and cylinder in a line parallel with their common longitudinal axis, stops formed on said control rod external of said chamber and cylinder, a piston rod actuated by said piston through said cylinder and said chamber and carrying an external projection coacting with said stops on said control rod, means controlled by the relative motion of said control rod and piston to admit said power medium to either end of said cylinder at the same time that some of the contents of the other end of the cylinder is permitted to escape therefrom, a control link pivoted at one end to said control rod and at the opposite end to a floating lever at one end thereof, a power link pivoted at one end to said piston rod and at the opposite end to the other end of said floating lever and to the actuating rod of a controlled mechanism and a controlling member pivotally connected to said floating lever between the ends thereof.

2. In a power control device, a controlling element, a floating lever pivotally attached thereto, a power link pivotally attached to said lever at one end, an operating element of a controlled mechanism connected at the same end of said lever, a control link pivotally connected at the opposite end of said lever, a power rod hinged to said power link, a lateral extension carried on said power rod having an aperture parallel therewith, a piston carried by said power rod having an aperture aligned with that in said lateral extension, a closed power cylinder adapted to slidably receive said piston, a pressure cylinder mounted adjacent said power cylinder, a control rod hinged to said control link and slidably mounted in said aligned apertures and having spaced stops coacting with said extension to permit limited relative movement between the control rod and the power rod, and means actuated by movement of the control rod for admitting pressure from the pressure cylinder to either side of the piston at the same time that the power medium is being exhausted from the opposite side of the piston.

WILLIAM O. TAIT, Jr.